(12) United States Patent
Lesan et al.

(10) Patent No.: US 9,795,925 B2
(45) Date of Patent: Oct. 24, 2017

(54) SEAL PLATE FOR MEMBRANE SEPARATION DEVICE

(75) Inventors: Frederick K. Lesan, Encinitas, CA (US); Nicholas Kordani, Rancho Palos Verdes, CA (US)

(73) Assignee: LG NANOH20, INC., El Segundo, CA (US)

( * ) Notice: Subject to any disclaimer, the term of this patent is extended or adjusted under 35 U.S.C. 154(b) by 686 days.

(21) Appl. No.: 14/241,710

(22) PCT Filed: Aug. 31, 2012

(86) PCT No.: PCT/US2012/053485
§ 371 (c)(1),
(2), (4) Date: Mar. 31, 2014

(87) PCT Pub. No.: WO2013/033616
PCT Pub. Date: Mar. 7, 2013

(65) Prior Publication Data
US 2014/0353239 A1    Dec. 4, 2014

Related U.S. Application Data

(60) Provisional application No. 61/530,609, filed on Sep. 2, 2011.

(51) Int. Cl.
*B01D 63/10* (2006.01)
*B01D 65/00* (2006.01)
*B01D 63/12* (2006.01)

(52) U.S. Cl.
CPC ......... *B01D 65/003* (2013.01); *B01D 63/106* (2013.01); *B01D 63/12* (2013.01);
(Continued)

(58) Field of Classification Search
CPC ............ B01D 2313/04; B01D 2313/16; B01D 2313/21; B01D 53/10; B01D 53/106;
(Continued)

(56) References Cited

U.S. PATENT DOCUMENTS 5,128,037 A * 7/1992 Pearl ................. B01D 61/10
                                                  210/321.74
5,851,267 A   12/1998 Schwartz
(Continued)

FOREIGN PATENT DOCUMENTS

CN    1170618 C    10/2004
CN    1286546 C    11/2006
(Continued)

OTHER PUBLICATIONS

EPO; Partial Supplementary European Search Report; Issued in European Patent Application No. 12827495.8, dated May 27, 2015; 6 Pages.
(Continued)

*Primary Examiner* — Pranav Patel
(74) *Attorney, Agent, or Firm* — Dentons US LLP

(57) ABSTRACT

A membrane separation unit can include a cartridge, at least one membrane disposed within the cartridge, at least one seal plate, and a sealing ring seated in an outer groove of the seal plate. The at least one seal plate can seal one end of the cartridge. The seal plate can have at least one venting hole that forms a passage between the interior of the cartridge and the outer groove. The sealing ring can have a cross-sectional shape that forms a circular venting path between the sealing ring and the seal plate. The sealing ring can include one or more grooves to allow fluid to vent into an annular space between a device housing and the membrane separation unit. The sealing ring can include an outer surface having, in cross-section, two flattened surfaces that form an angle of between 90° and 175° there between.

16 Claims, 10 Drawing Sheets

(52) U.S. Cl.
CPC .......... *B01D 65/00* (2013.01); *B01D 2311/14* (2013.01); *B01D 2313/04* (2013.01); *B01D 2313/16* (2013.01)

(58) Field of Classification Search
CPC ............... B01D 53/126; B01D 65/003; B01D 2201/291; B01D 2201/298; B01D 2201/34; B01D 2201/342; B01D 2201/345; B01D 2201/347; F16J 15/3204; F16J 15/3232; F16J 15/3236
See application file for complete search history.

(56) References Cited

U.S. PATENT DOCUMENTS

| | | |
|---|---|---|
| 6,224,767 B1 | 5/2001 | Fujiwara et al. |
| 6,632,356 B2 | 10/2003 | Hallan et al. |
| 7,160,455 B2 | 1/2007 | Taniguchi et al. |
| 7,335,300 B1 | 2/2008 | Stamey, Jr. et al. |
| 8,377,300 B2 | 2/2013 | Katayama et al. |
| 2003/0024868 A1 | 2/2003 | Hallan et al. |
| 2004/0178136 A1 | 9/2004 | Taniguchi et al. |
| 2044/0178136 | 9/2004 | Taniguchi et al. |
| 2006/0049093 A1 | 3/2006 | Chikura et al. |
| 2010/0043891 A1* | 2/2010 | Wilke .................. F16J 15/3236 137/484.2 |
| 2010/0155334 A1* | 6/2010 | Taniguchi .............. B01D 63/02 210/650 |
| 2011/0000844 A1 | 1/2011 | Uda et al. |
| 2011/0042294 A1 | 2/2011 | Bonta et al. |
| 2011/0049034 A1* | 3/2011 | Theron .................. B01D 61/10 210/232 |
| 2011/0084455 A1 | 4/2011 | Elwell et al. |
| 2011/0290711 A1 | 12/2011 | Katayama et al. |
| 2012/0043331 A1 | 2/2012 | Nameki et al. |

FOREIGN PATENT DOCUMENTS

| | | |
|---|---|---|
| CN | 100522326 C | 8/2009 |
| CN | 202460481 U | 10/2012 |
| EP | 0492250 A1 | 7/1992 |
| EP | 2745915 A1 | 6/2014 |
| JP | S55-155505 A | 4/1980 |
| JP | 2009-220070 A | 10/2009 |
| WO | 2010/090251 A1 | 8/2010 |
| WO | 2010090251 A1 | 8/2010 |
| WO | 2010-128606 A1 | 11/2010 |
| WO | 2010-090251 A1 | 12/2010 |

OTHER PUBLICATIONS

IPOS; Office action issued in Singapore Patent Application No. 11201402804Q; dated Dec. 11, 2015; 7 Pages.
CPO; Office Action Issued in Chinese Patent Application Serial No. 201280053907.3; dated Mar. 17, 2016; 22 Pages including English Language Translation.
Office Action, dated Feb. 11, 2015, in connection with corresponding Singapore Patent Application No. 11201402804Q, (7 pages) [English].
International Search Report and Written Opinion in International Application No. PCT/US2012/053485, dated Jan. 31, 2013, 11 pages.
International Preliminary Report on Patentability in International Application No. PCT/US2012/053485, dated Mar. 13, 2014, 7 pages.
JPO; Office Action Issued in Corresponding Japanese Patent Application No. 2014-528665; dated May 26, 2016; 6 Pages with English Language Translation.

* cited by examiner

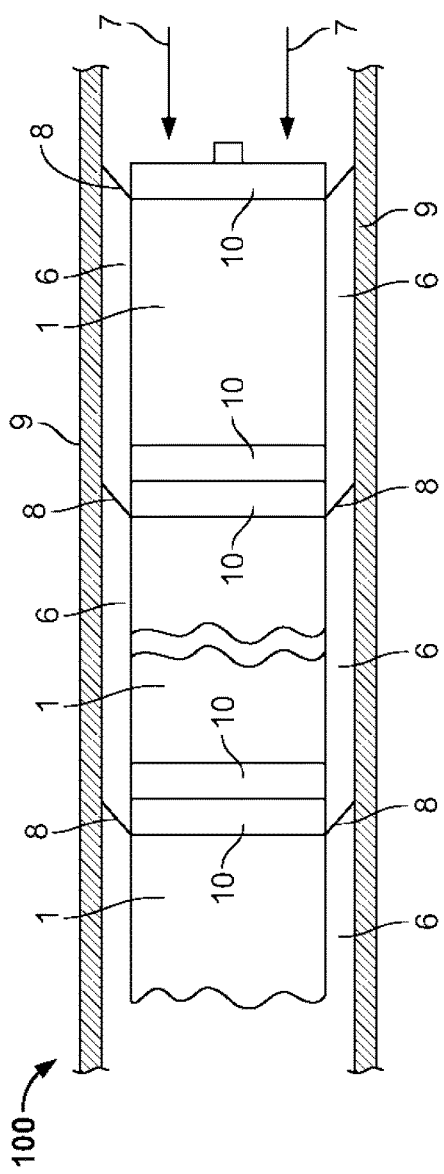
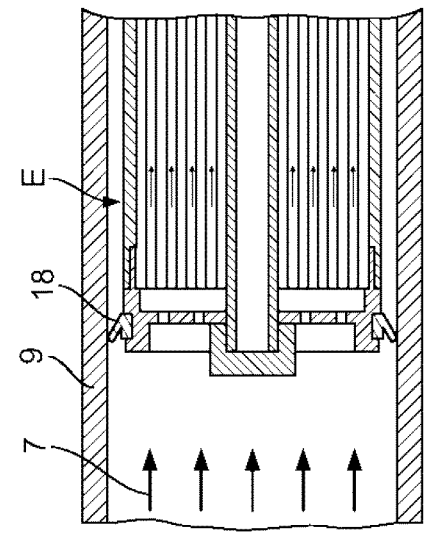
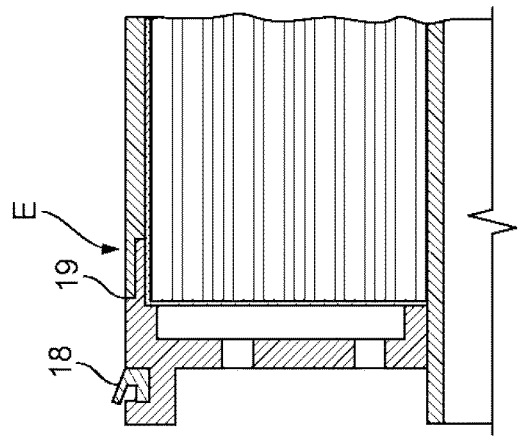
FIG. 1
FIG. 2A (Prior Art)
FIG. 2B (Prior Art)

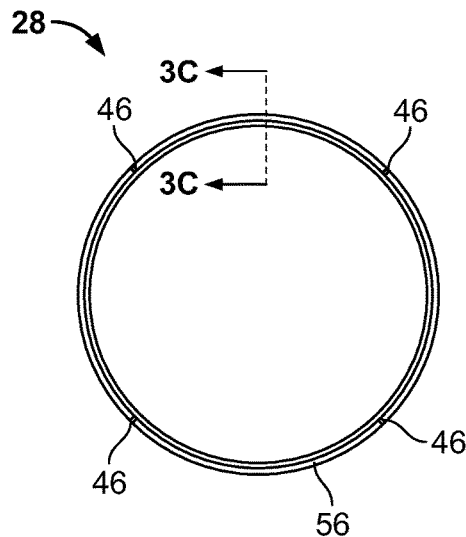
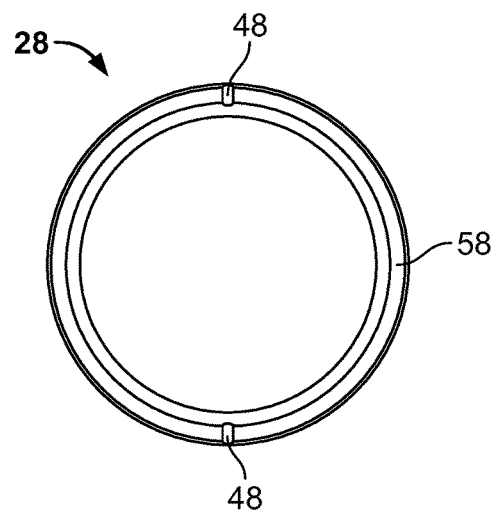
FIG. 3A  FIG. 3B
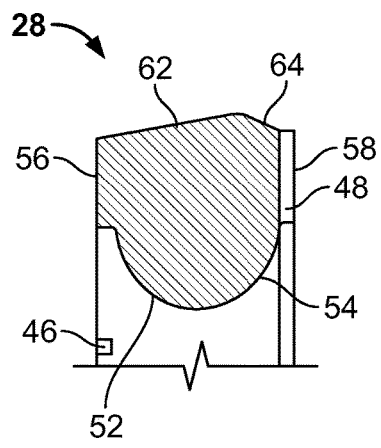
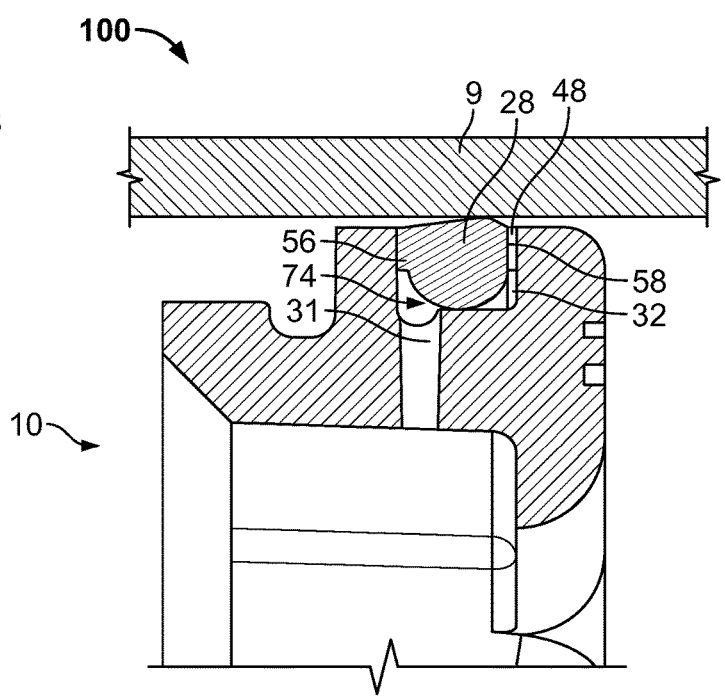
FIG. 3C  FIG. 4

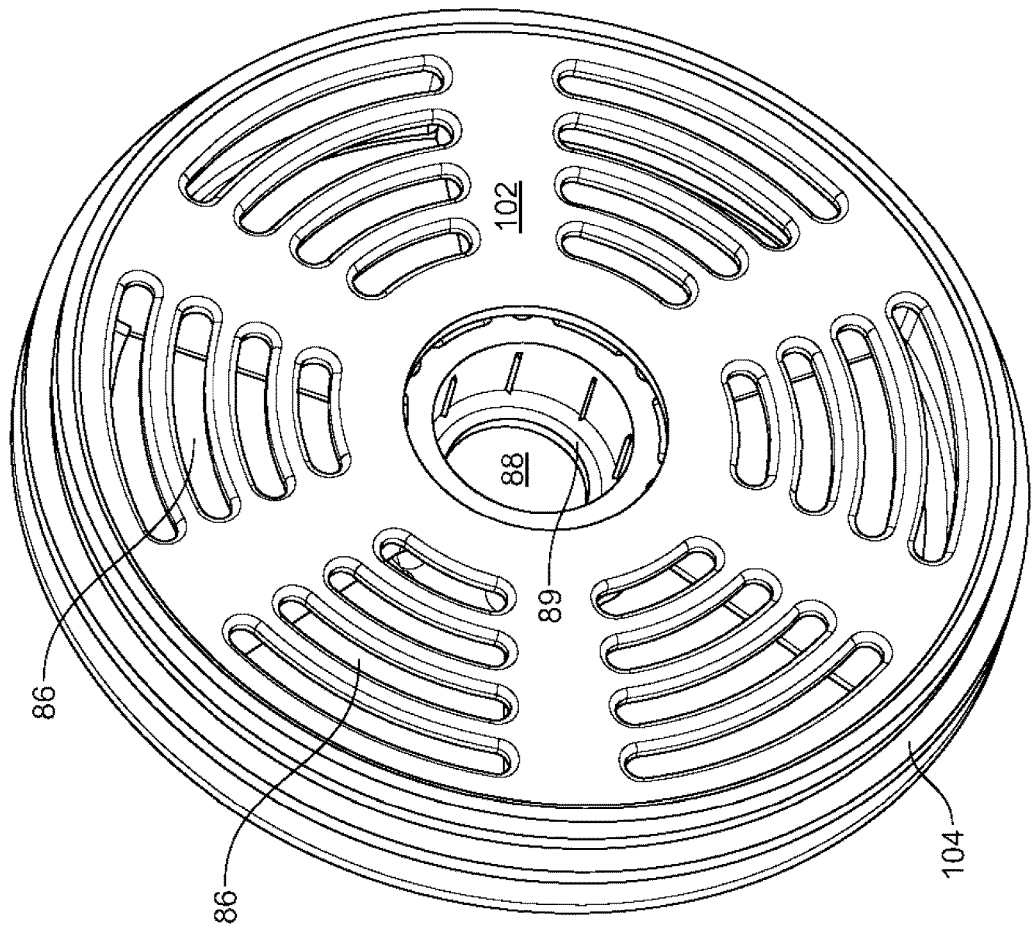
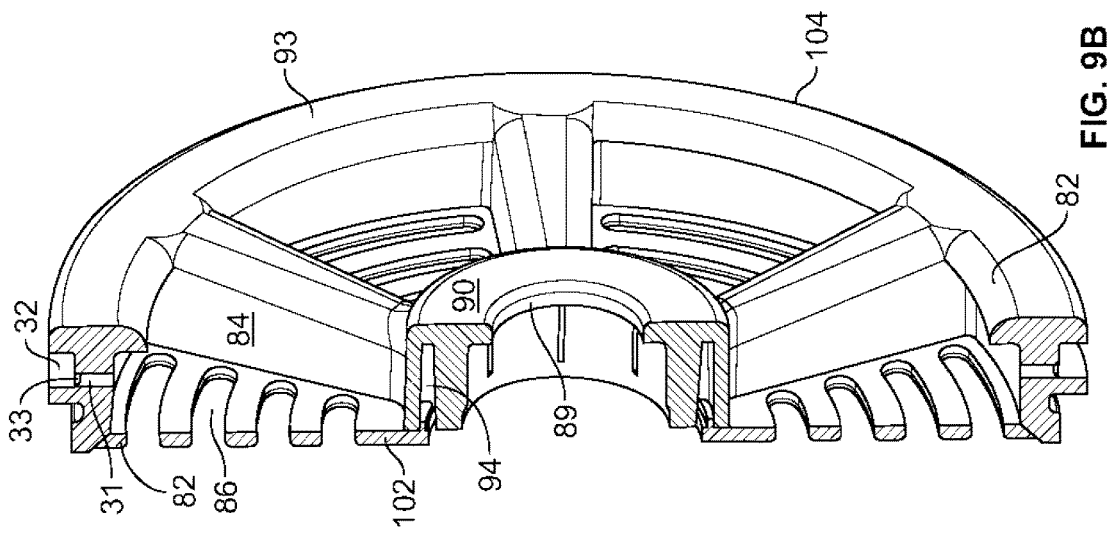
FIG. 9A
FIG. 9B

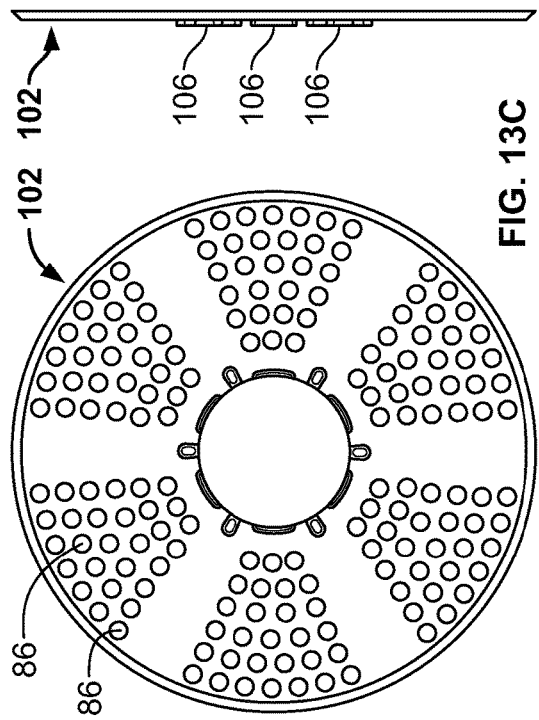
FIG. 13C
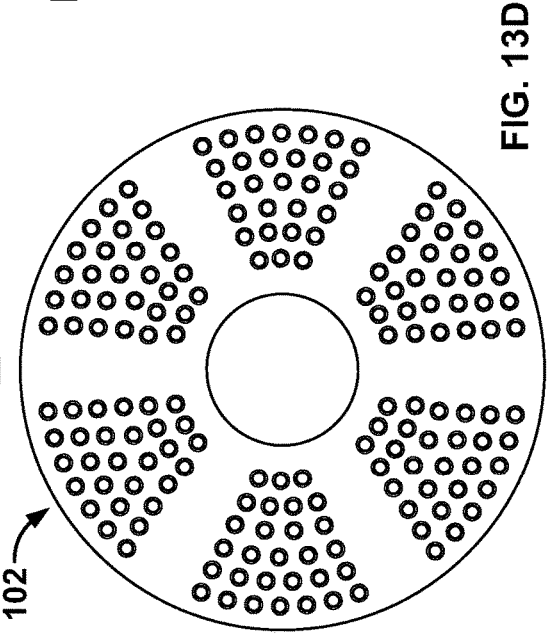
FIG. 13E
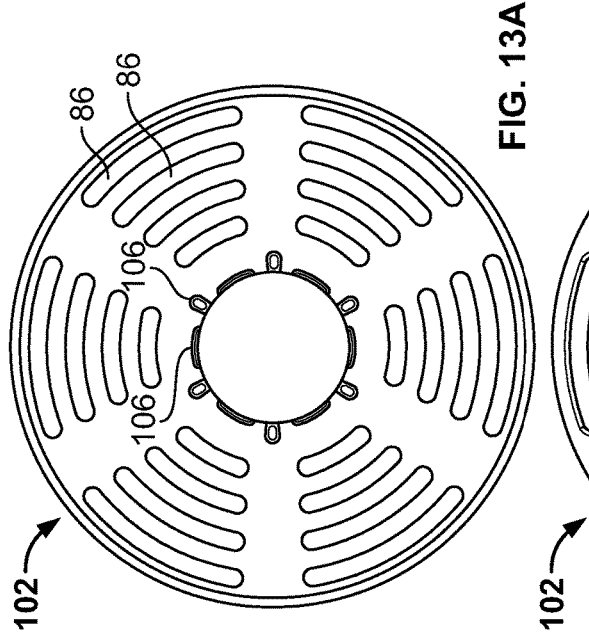
FIG. 13A
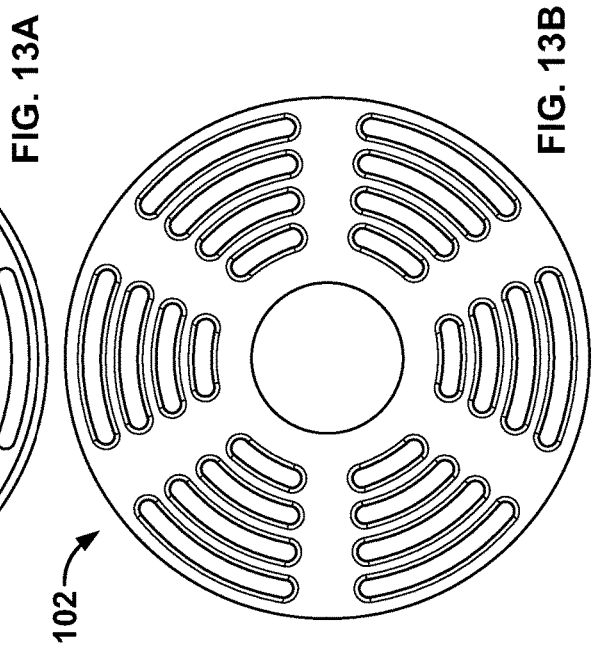
FIG. 13B
FIG. 13D

SEAL PLATE FOR MEMBRANE SEPARATION DEVICE

CROSS-REFERENCE TO RELATED APPLICATIONS

This application is a National Stage application under 35 U.S.C. §371 of International Application No. PCT/US2012/053485, having an International Filing Date of Aug. 31, 2012, which claims priority to U.S. Application Ser. No. 61/530,609, filed on Sep. 2, 2011, which is hereby incorporated by reference in its entirety.

FIELD

This document relates to systems and techniques for forming an improved seal in a membrane separation device, such as between a spiral membrane unit and a membrane separation device housing holding one or more spiral membrane units.

BACKGROUND

Membrane separation devices can be used in a variety of fields. In some cases, membrane separation devices can be used to purify water. For example, sea water can be purified in a membrane separation device using reverse osmosis to provide drinking water. In wastewater treatment, membrane separation devices can be used to remove particles, colloids, and macromolecules to disinfect the wastewater.

Membrane separation devices can include one or more spiral membrane units. A spiral membrane configuration is often used so that a flat sheet membrane can be efficiently packaged within a small space. A spiral membrane configuration can be packaged within a cartridge to form a spiral membrane unit. The spiral membrane units are typically loaded into a cylindrical device housing. The cylindrical device housing can contain the pressure applied to the fluid passing through the spiral membrane unit, as high pressures can be important for an efficient separation process.

As the pressurized feed flow is introduced into the end of a device housing, a seal along the outside surface of the spiral membrane unit is used to ensure that feed fluid is directed into the spiral membrane unit's flow channels and not into an annular space between the device housing walls and the spiral membrane unit. The seal can be located about the periphery of a seal plate. Prior art devices typically used seals with a chevron cross section, as shown in FIGS. 2A and 2B. A chevron cross-section seal 18 can require that each spiral membrane unit E be inserted into a housing 9 in the direction of feed flow 7. Each spiral membrane unit E is thus removed by pushing each spiral membrane unit E all the way through the device housing 9 in the feed flow direction. As a consequence, facilities that include the use of spiral membrane units E include building layouts that provide access at both sides of the cylindrical housing for inserting and removing the spiral membrane units during maintenance.

SUMMARY

This document describes sealing systems, seal plates, and sealing rings that may be used with membrane separation devices. In some cases, the sealing systems provided herein can relieve pressure differentials between different sections of membrane separation devices while still providing a robust seal between each membrane separation unit and a device housing holding multiple membrane separation units. In some cases, the membrane separation units provided herein can be inserted and removed from a device housing in both a fluid flow direction and in an opposite direction. The sealing systems provided herein can also allow for a fluid flow in both a normal fluid flow direction and a reverse direction.

In some cases, a membrane separation unit can include a cartridge, at least one membrane disposed within the cartridge, at least one seal plate, and a sealing ring seated in an outer groove of the seal plate. The cartridge can have an interior, an exterior, and a pair of ends. The seal plate can seal one end of the cartridge. The seal plate can have at least one venting holes that forms a passage between the interior of the cartridge and the outer groove. In some cases, the sealing ring can have a cross-sectional shape that forms a circular venting path between the sealing ring and the seal plate. In some cases, the sealing ring can include one or more grooves to allow fluid to vent into an annular space between a device housing and the membrane separation unit. In some cases, the sealing ring can include an outer surface having, in cross-section, two flattened surfaces that form an angle of between 90° and 175° there between. The flattened surfaces can meet at a peak and the sealing ring can be arranged within an outer groove of a seal plate such that the peak can be pressed against an inside wall of a device housing to form a robust seal.

The details of one or more embodiments are set forth in the accompanying drawings and the description below. Other features and advantages will be apparent from the description and drawings, and from the claims.

DESCRIPTION OF DRAWINGS

FIG. 1 is an example of how spiral membrane units can be positioned in a cylindrical device housing.

FIGS. 2A and 2B show an example of a prior art sealing ring.

FIGS. 3A-3C show an example of a sealing ring provided herein.

FIG. 4 is a cross-sectional view of a sealing ring in an outer groove of a seal plate.

FIG. 9A is a perspective view showing a bottom portion of a seal plate.

FIG. 9B is a cross-sectional view of a seal plate.

FIGS. 13A-E depict views of various hole plate designs for a seal plate.

Like reference symbols in the various drawings indicate like elements.

DETAILED DESCRIPTION

Figure 5:
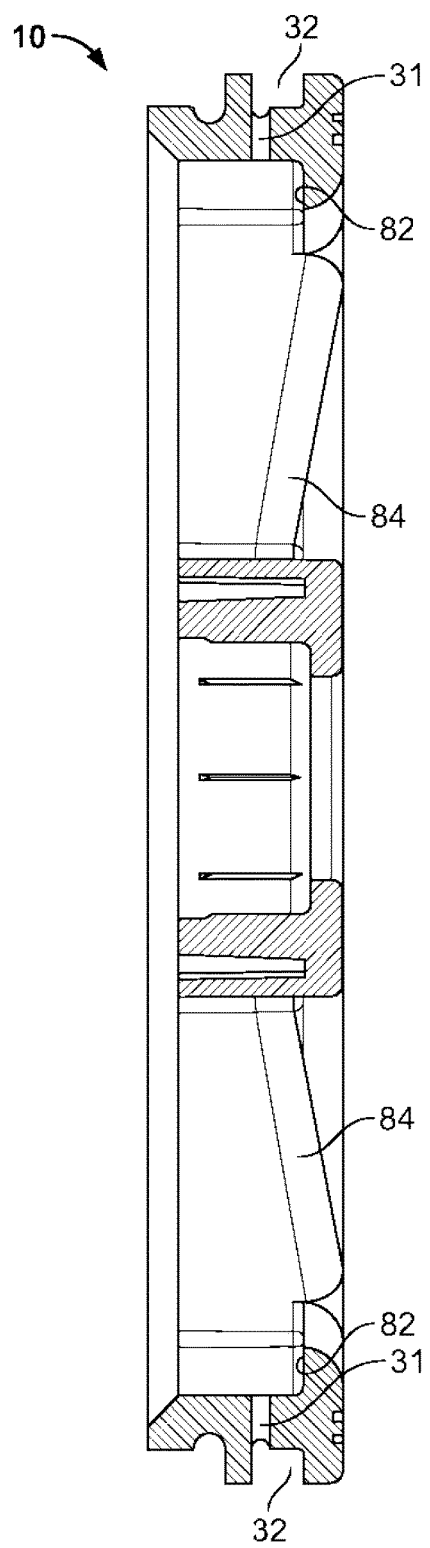
FIG. 5 shows an example of a seal plate.

A spiral membrane configuration can be used for packaging flat sheet membranes into a space efficient configuration for use in membrane separation devices. A spiral membrane configuration can be included in a membrane separation unit that includes the spiral configured separation membrane within a cartridge. Seal plates can be attached at opposite ends of the cartridge to form a membrane separation unit. Seal plates can include passageways to guide a fluid flow through a spiral membrane within the cartridge and to collect fluid that passes through the spiral membrane. Each spiral membrane unit can be loaded into and removed from a cylindrical device housing of a membrane separation device. As shown in FIG. 1, a pressurized feed flow 7 is introduced into the end of the device housing 9 of a membrane separation device 100. A plurality of sealing rings 8 seated in sealing plates 10 direct the feed flow into the spiral element flow channel(s) 7 and prevent fluid from flowing into the annular space 6 between the cylinder wall of device housing 9 and the membrane separation unit 1.

Referring to FIGS. 3-13, sealing rings 28 and seal plates 10, as provided herein, can be used in a membrane separation device. The sealing rings 28 provided herein can allow the spiral membrane units to be moved within the cylindrical device housing 9 of a membrane separation device (e.g., as depicted in FIG. 1) in either direction. The sealing rings 28 and seal plates 10 provided herein also allow a reverse fluid flow of fluid through the spiral membrane configuration, which can be useful during maintenance and/or cleaning operations.

As shown in FIGS. 4-13, the seal plate can include an outer groove 32. The outer groove 32 is positioned to be adjacent to an inside surface of a device housing 9. A sealing ring 28 can be positioned within the outer groove 32 to provide a seal between the membrane separation unit 1 and the cylindrical device housing 9 of a membrane separation device 100 (e.g., as depicted in FIG. 4).

FIGS. 3A-3C depict an example of a sealing ring 28. Referring to FIGS. 3A and 3B, the sealing ring 28 can have a circular shape. FIG. 3A depicts the rear face of the sealing ring 28. FIG. 3B depicts the front face of the sealing ring 28. FIG. 3C depicts a cross-section of the sealing ring 28. In cross-section, as shown in FIG. 3C, the inside surface of the sealing ring can include rounded bottom portions 52 and 54, similar to a conventional o-ring. Front face 58 and rear face 56 can have a flat cross-sectional shape. Flattened faces 56 and 58 of sealing ring 28 can maintain contact with the walls of the seal-retaining outer groove 32. Flattened faces 56 and 58 can prevent rotation of the sealing ring 28 within the outer groove 32 of the seal plate 10, especially during insertion of the membrane separation unit 1 into a membrane separation device 100 or movement of the membrane separation unit 1 in either direction.

As shown in FIGS. 3B and 3C, the front face 58 of the sealing ring 28 can include two front-face grooves 48. As shown in FIGS. 3A and 3C, the rear face 56 of the sealing ring 28 can include four rear-face grooves 46. In some cases, the front and/or rear faces can have any suitable number of grooves. The top surface 62 and 64 of the sealing ring 28 rise to a point to minimize the drag force of the seal in contact with the cylinder wall of the device housing 9. Minimizing drag can make it easier to insert and remove the spiral membrane units 1, particularly where a large number of membrane separation units are placed in series within a membrane separation device, which can multiply the loading force needed to move the membrane separation units within the device housing 9 with the additions of each membrane separation unit 1. The sealing ring 28 can include a top surface having two flat surfaces that form an angle of between 90° and 175° between the two surfaces. In some cases, the two flat surfaces form an angle of between 100° and 160°. In some cases, the two flat surfaces form an angle of between 120° and 150°.

In some cases, the sealing ring 28 can have a diameter of between 0.5 inch and 100 inches, between 1 inch and 50 inches, between 2 inches and 25 inches, between 4 inches and 15 inches, or between 6 inches and 10 inches. For example, the sealing ring 28 can have a diameter of about 2, 2.5, 4, 8, or 16 inches. In cross-section (e.g., as shown in FIG. 3C), the sealing ring 28 can have a height of between 0.1 inches and 1.0 inches, between 0.2 inches and 0.5 inches, or between 0.25 inches and 0.30 inches. In cross-section (e.g., as shown in FIG. 3C), the sealing ring 28 can have a thickness of between 0.1 inches and 1.0 inches, between 0.2 inches and 0.5 inches, or between 0.25 inches and 0.30 inches. For example, the sealing ring 28 can have a thickness of about 0.27 inches and a height of about 0.27 inches. Rear-face grooves 46 and Front-face grooves 48 can each have a depth of between about 0.010 and 0.25 inches, between 0.015 and 0.150 inches, or between 0.020 and 0.10 inches. For example, the depth of the rear-face and/or front-face grooves can be about 0.025 inches. The width of the rear-face and/or front-face grooves can between 0.01 inches and 0.5 inches, between 0.02 inches and 0.2 inches, or between 0.05 inches and 0.1 inches. Alternatively, grooves 46 of similar dimensions can be located in the seal plate outer groove 32 (e.g., along the side of the outer groove 32).

As discussed above, multiple membrane separation units 1 can be placed within a single device housing 9 and a feed flow passed into the housing 9. Each membrane separation unit 1 can have its own sealing ring 28. Each sealing ring 28 can prevent the bypass of feed flow into the outer annular space between the housing 9 and the membrane separation unit 1. The inside surface of the sealing ring 28 can form a continuous seal with a seal plate 10 such that the feed flow does not bypass the sealing ring 28. The feed flow thus passes through a desired passage of the seal plate 10 and into an internal space of the membrane separation unit 1. Problems, however, can occur when there is a pressure difference between the outer annular space and the space within each membrane separation unit 1. A large pressure difference can cause parts of the membrane separation unit 1 or the housing 9 to bend or crack and may result in undesired flows of fluid. Large pressure differences may typically occur during startup operations or other transient operating conditions. For example, during normal operation of the membrane separation device, there may only be a small pressure difference (e.g., between 1 and 10 psi), but start up conditions can result in pressure differences of up to about 800 psi. The sealing ring 28 and seal plate 10 provided herein can balance the pressure between the outer annular space and the inside of the seal while still stopping the feed flow from flowing around the seal plate 10 into the outer annular space.

Figure 6:
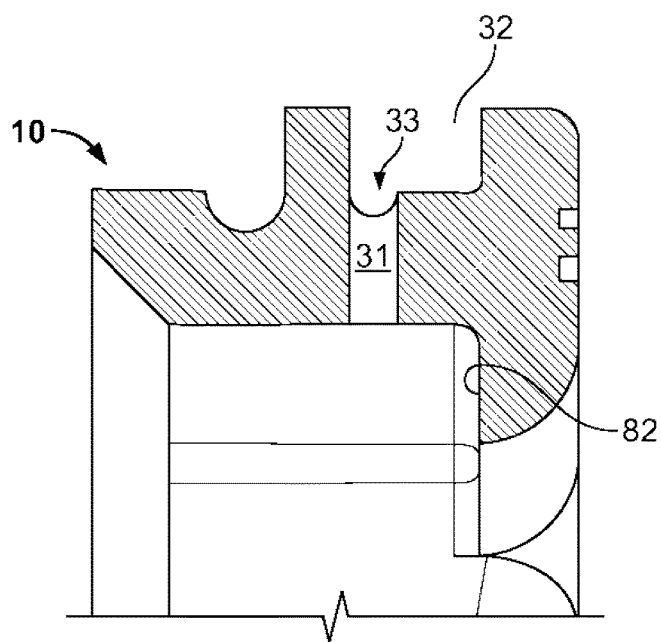
FIG. 6 shows a cross-sectional view of a portion of the seal plate of FIG. 5.

Referring to FIGS. 4-6, a seal plate 10 can include an outer groove 32. The sealing ring 28 can be positioned in the outer groove 32. One or more radial holes 31 can be formed in the seal plate 10. The radial holes 31 can provide a fluid flow path communicating between an internal space in the membrane separation unit 1 and the outer groove 32. The radial holes 31 can allow fluid to pass into the outer groove 32. In some cases, fluid can flow through rear-face grooves 46 and into the outer annular space, which can allow for an equalization of pressure between the annular space and the membrane separation unit 1. In some cases, the dimensions of the rear-face grooves 46 and the radial holes 31 can be selected to limit the flow of fluid into the outer annular space when the pressure difference is below a threshold value (e.g., less than 50 psi, less than 25 psi, less than 10 psi, or less than 5 psi), but allow a rapid pressure equalization if the pressure difference exceeds the threshold value. In some case, the radial holes can have a diameter of between 0.05 inches and 0.3 inches. For example, the radial holes can have a diameter of about 0.1 inches. Although radial holes 31 shown are "round," they can also be a "slot" (e.g., ¼ inch long) along the outer groove 32 to allow rapid equalization of the pressure or transfer of fluid.

The sealing ring 28 and seal plate 10 can provide a circular venting path 74 behind the peripheral seal of the sealing ring 28. As shown in FIG. 4, a circular venting path 74 can be formed between the rounded inside surface of the sealing ring 28 and the outer groove 32 of the seal plate 10. The circular venting path 74 can allow fluid communication between each rear face groove 46 and/or between each radial hole 31. In some cases, circular venting path 74 can be achieved by providing grooves in the inside surface the sealing ring 28 and/or a grooved depression 33 at the back edge of the outer groove 32 of the seal plate. In some cases, the circular venting path 74 may be the result of the outer groove 32 having a more rectangular cross-section than an inside surface of the sealing ring 28.

The circular venting path 74 can communicate with the inside of the membrane separation unit 1 via one or more radial holes 31 in the seal plate. FIG. 4 depicts how a circular venting path 74 can communicate with the a radial hole 31 and thus with the inside of the membrane separation unit 1. The venting path 74 further allows different radial holes 31 to communicate with each other, which can thus allow for the pressure to be balanced between different internal sections of the membrane separation unit 1 (i.e., pressure can equalize hoop-wise). One or more radial holes 31 in combination with rear-face grooves 46 and/or 48 in the sealing ring 28 can allow the pressure to be balanced between the inside and outside of the membrane separation unit 1. As the venting occurs behind the sealing ring 28 via the radial holes 31, the venting path 74, and the rear-face grooves 46 and/or 48, the sealing ring 28 can still function to prevent any bypass flow around the spiral elements. Because of the circular venting path 74, rear-face grooves 46 can be offset or aligned with the radial holes 31. In some cases, a pressure differential can be balanced due to venting through front-face grooves 48 due to an increase of the pressure in the circular venting path 74 breaking the seal between the outer groove 32 and an inside surface of the sealing ring 28.

The seal plates 10 provided herein can also include one or more pulling lips, which can be used as a gripping point for pulling the membrane separation unit 1 out of a device housing 9. Because the sealing rings 28 provided herein can be moved in the housing in both directions, someone installing a new membrane separation unit 1 can remove an old membrane separation unit 1 by gripping a pulling lip. For example, as shown in FIG. 5, a lip 82 can extend from an inside surface of an outer ring of a seal plate 10. The lip 82 can be provided between the attaching spokes 84 that attach a central ring 90. Lip 82 can be adapted to be grabbed by a person's hand in order to remove the membrane separation unit 1. This arrangement can also been seen in FIG. 7. In some cases, seal plate 10 can include other gripping elements to facilitate the removal and servicing of membrane separation units 1 during loading and unloading of the spiral membrane units 1 into the membrane separation device.

Figure 7:
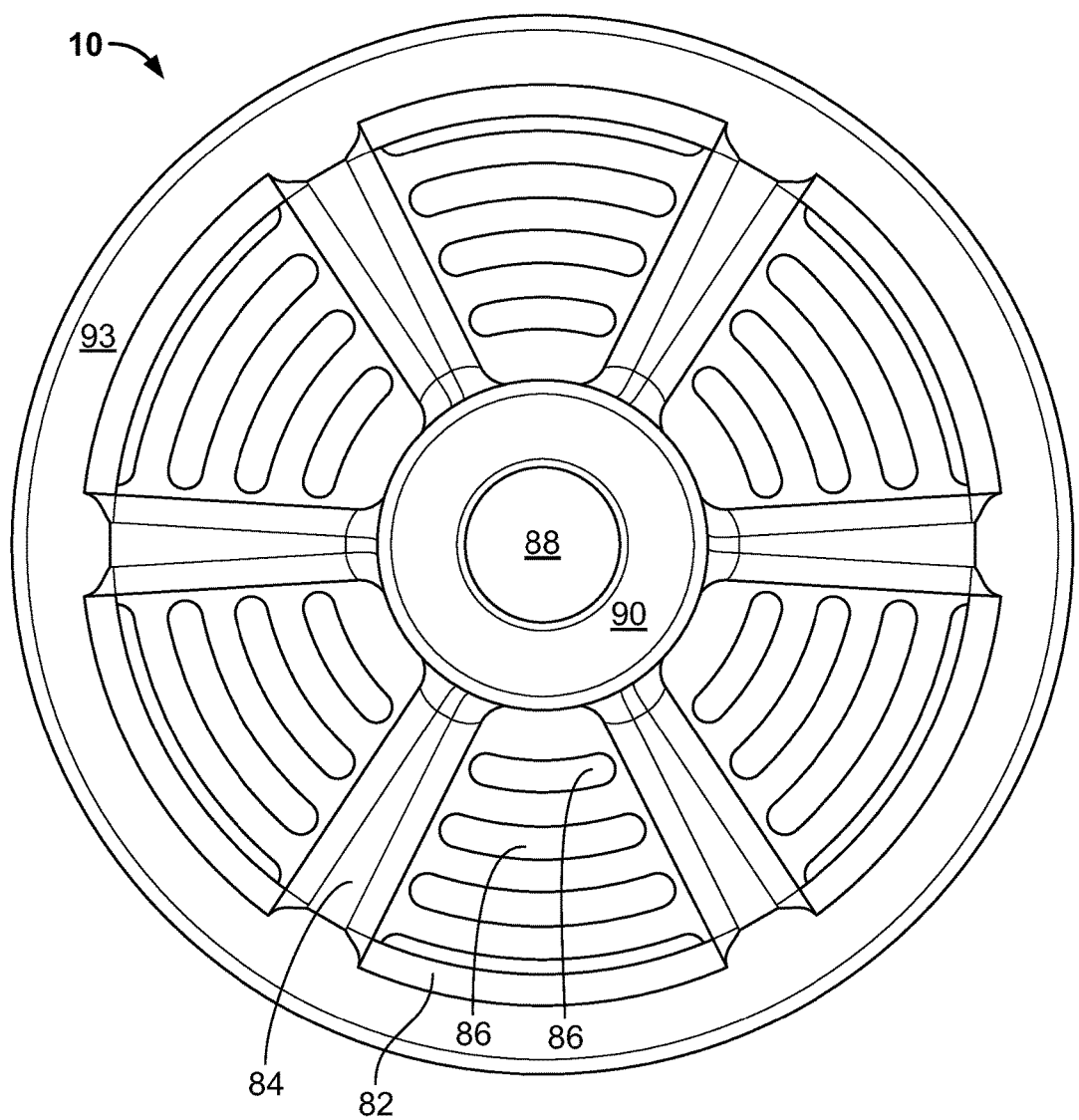
FIG. 7 is a front view of a seal plate.

As shown in FIG. 7, a seal plate 10 can include lips 82 between attaching spokes 84 to provide a gripping surface for removing the element 1. Between the attaching spokes 84, passages 86 are provided for the passage of fluids that have not passed through the membrane. A central ring 90 defines a central opening 88 for the flow of fluid that has passed through the membrane. In some cases, a central opening 88 at the front of a membrane separation unit at the front of a membrane separation device is capped to prevent a feed flow within the device housing from passing into the central opening until it has passed through the spiral membrane. Once fluid has passed through the spiral membrane it can flow into a central passageway in the membrane separation device 1 and out of a central opening 88 in a rear seal plate. An adjacent membrane separation unit can be placed so that a fluid flow out of a central opening 88 of a first membrane separation unit flows into the central opening 88 of the adjacent membrane separation unit.

Figure 8B:
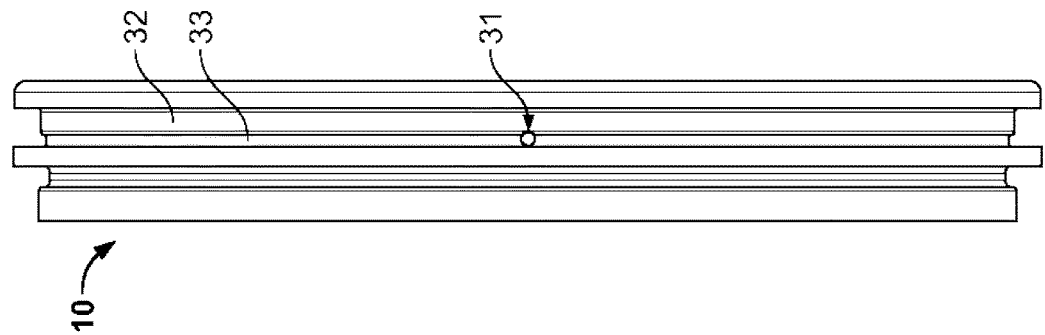
FIG. 8B is a side view of a seal plate.
Figure 8A:
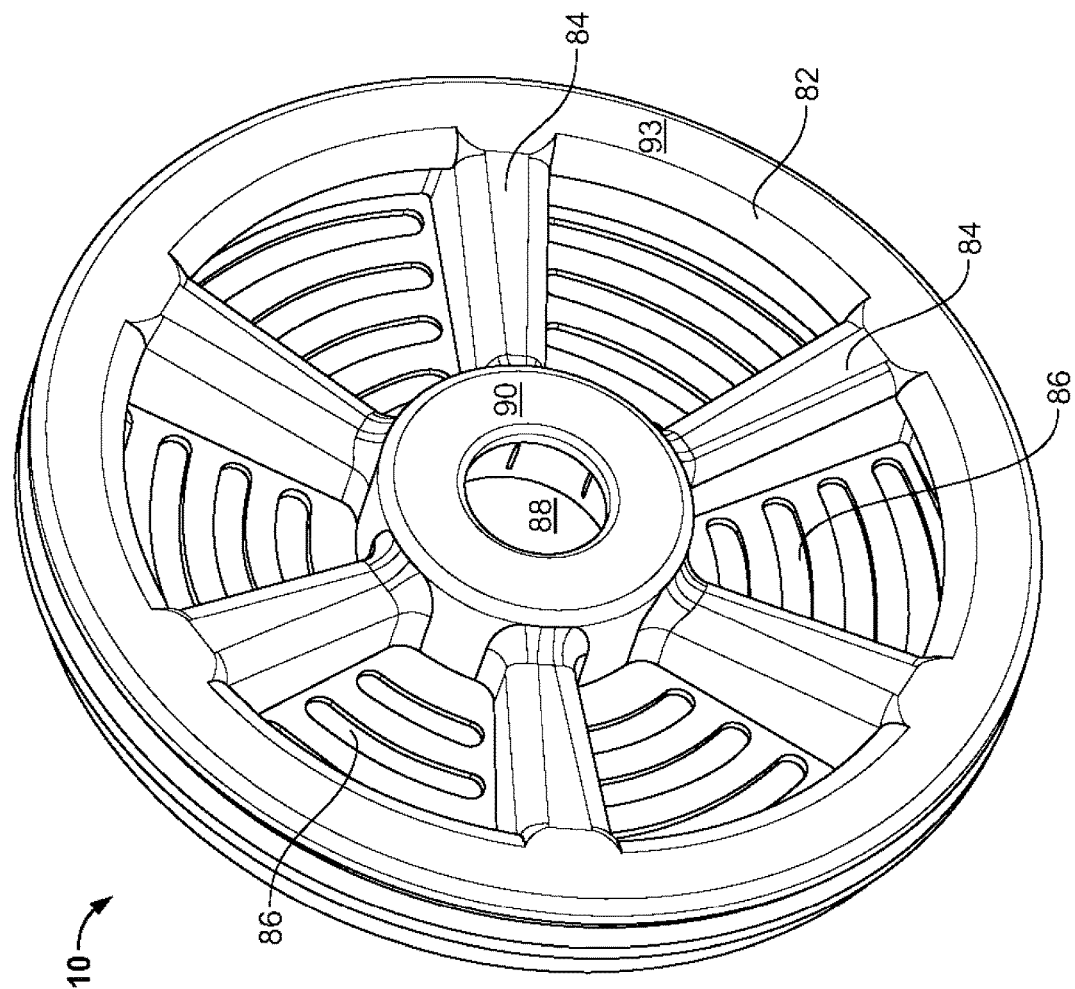
FIG. 8A is a perspective view of a seal plate.
Figure 10:
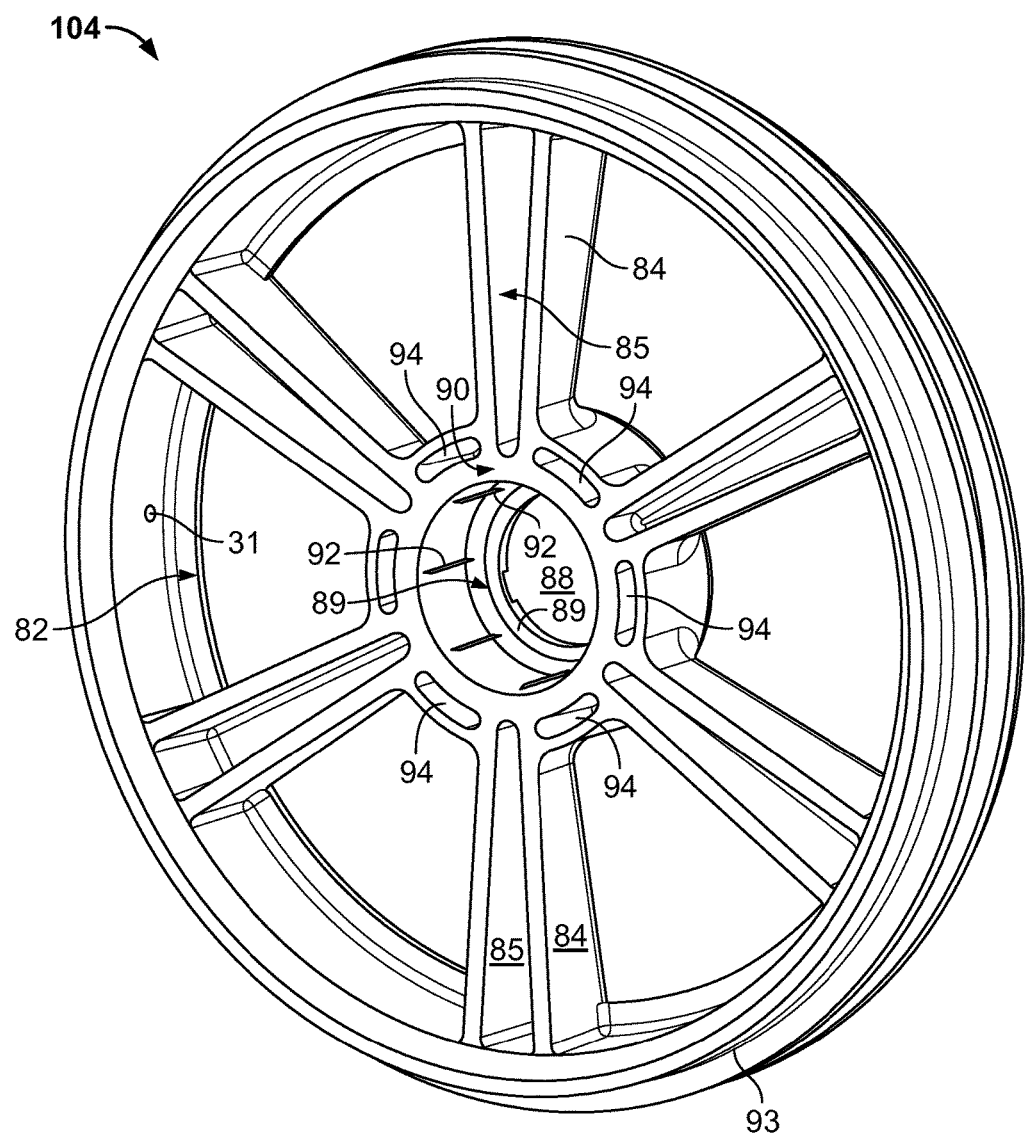
FIG. 10 is a perspective view of a first part of a seal plate.

FIGS. 8A and 8B depict alternative views of the seal plate 10 of FIG. 7. As shown in FIG. 8B, the outer groove 32 includes a second circular venting pathway groove 33, which cooperates with a sealing ring 28 to provide a circular venting path 74. The seal plate 10 can include two 0.10 inch diameter vent holes 31.

FIG. 9A depicts the bottom of a seal plate 10. FIG. 9B depicts a cross-sectional view of the seal plate 10. As shown, the seal plate 10 can have a two-part design. A first part 104 can include an outer ring and a central ring 90 and a plurality of spokes 84 connecting them. A second disk part 102 can include a disk having a plurality of passages 86 there through and a central passageway. When connected, the central passageway of the disk part 102 can align with the central opening 88 of the first part 104. The plurality of passages 86 in the disk part 102 can be positioned between the central ring 90 and the outer ring of the first part when the first part 104 and the disk part 102 are attached.

FIGS. 10 and 11A-E depict the first part 104 of the seal plate 10 in further detail. As shown, the first part 104 includes spokes 84, gripping lips 82, and a center ring 90 with a central opening 88. The center ring 90 can be adapted to accommodate a 2-inch diameter brackish water core tube. A stop lip 89 can also be included along the central opening 88. The spokes 84 can have a hollow interior 85 that prevents deformation and/or warping during molding processes. Crush ribs 92 can be provided along the inside surface of the center ring 90 to facilitate core tube alignment.

Figures 11A, 11B, 11C, 11D, 11E:
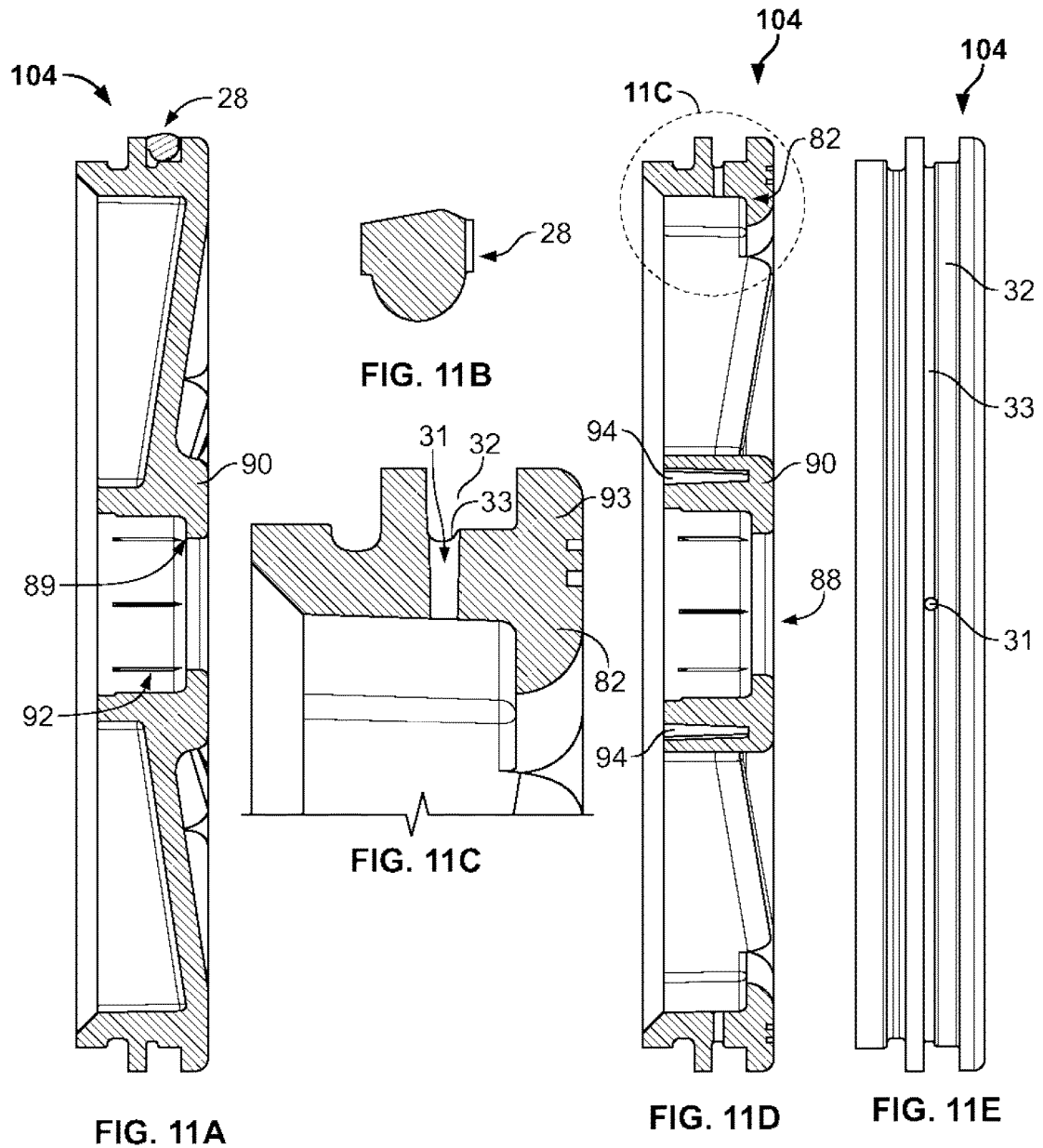
FIGS. 11A-E depict cross-sectional views of a first part of a seal plate.

FIGS. 11A-E depict different embodiments of a first part 104 of a seal plate 10 and how the first part engages with a sealing ring 28. FIG. 11D shows a central ring 90 having an attachment groove 94 adapted for attachment to disk part 102 (depicted in FIGS. 9, 12, and 13). The outer ring of the first part 104 can include rounded corners to facilitate insertion into a device housing 9.

Figure 12D:
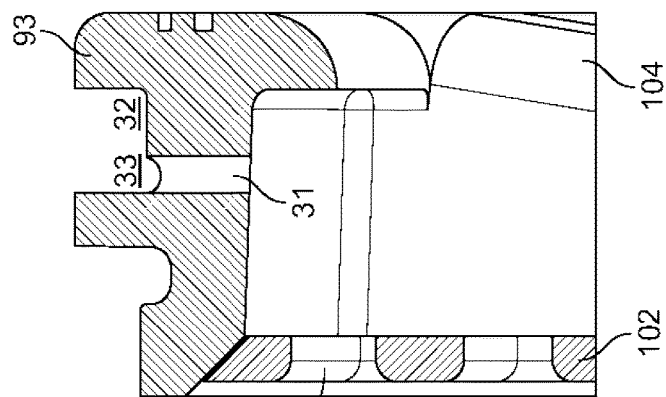
FIGS. 12A-D depict cross-sectional views of a two-part design of a seal plate.
Figure 12C:
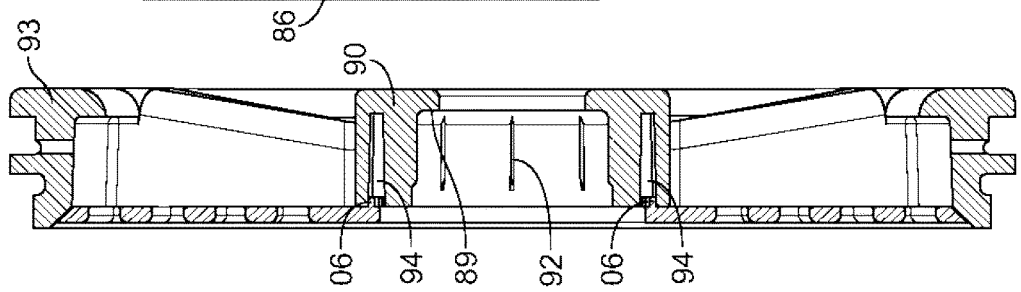
Figure 12B:
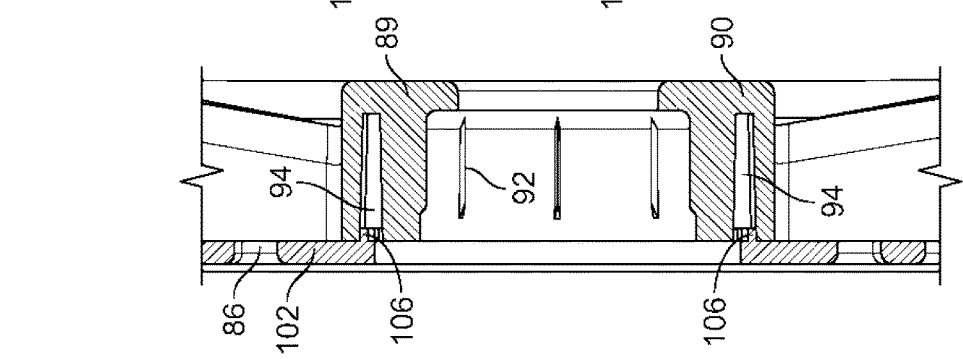
Figure 12A:
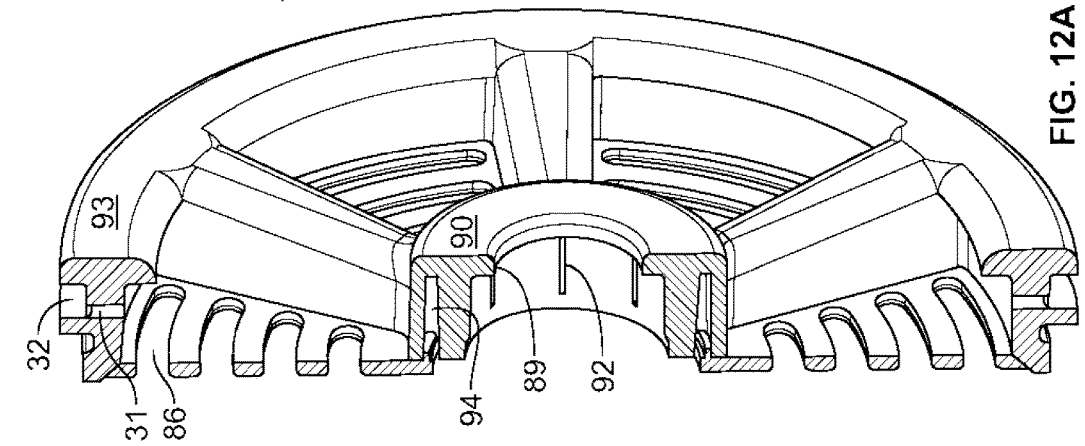

FIGS. 12A-D depict how the second disk part 102 can be attached to the first part 104. FIG. 12B shows a close up of how attachment projections 106 can mate with attachment groove 94 in a snap-fit relationship. In some cases, the first part and the second part can be attached by adhesive.

FIGS. 13A-E depicts alternative of a second disk part 102. FIGS. 13A and 13B depict the top and bottom of a first disk hole pattern having elongated openings 86 there through. FIGS. 13C and 13D depict the top and bottom of a second disk hole pattern having circular openings 86. FIG. 13E is a side view of a second disk part 102. As shown, snap-fit projections 106 extend from the surface.

In some case, a seal plate system can include multiple disk part designs each having different arrangements of openings and/or different shaped openings 86. Each disk part design can have unique color, which can be used for identification purposes by someone installing or removing a membrane separation unit 1 in a membrane separation device.

What is claimed is:

1. A membrane separation unit comprising:
   (a) a cartridge having an interior, an exterior, and a pair of ends;
   (b) at least one membrane disposed within the cartridge;
   (c) at least one seal plate for sealing one end of the cartridge, the at least one seal plate comprising an outer groove and at least one venting hole that forms a passage between the interior of the cartridge and the outer groove; and
   (d) a sealing ring seated in the outer groove, the sealing ring having a cross-sectional shape that forms a circular venting path between the sealing ring and the at least one seal plate, wherein a cross-section of the sealing ring comprises:
   a rounded bottom portion;
   a flat front face;
   a flat rear face; and
   a top surface having a first flat surface and a second flat surface, the first flat surface connected to the flat front face and the second flat surface connected to the flat rear face, the first flat surface and second flat surface meeting to form a peak between the flat front face and the flat rear face, the first and second flat surfaces forming an angle of between 90° and 175° therebetween.

2. The membrane separation unit of claim 1, wherein the outer groove includes a second groove therein that forms at least a portion of the circular venting path.

3. The membrane separation unit of claim 1, wherein an inside surface of the sealing ring includes a groove that forms a least a portion of the circular venting path.

4. The membrane separation unit of claim 1, wherein the membrane disposed within the cartridge is in a spiral configuration.

5. A membrane separation device, comprising:
   (a) a device housing having an inside surface; and
   (b) a plurality of membrane separation units disposed in series in the device housing, wherein each of the membrane separation units has the structure according to claim 1, wherein the plurality of membrane separation units are seated within the device housing such that the sealing ring contacts an inside surface of the device housing to form a seal between the membrane separation units and the device housing.

6. The membrane separation device of claim 5, wherein the device housing is cylindrical.

7. A membrane separation unit comprising:
   (a) a cartridge having an interior, an exterior, and a pair of ends;
   (b) at least one membrane disposed within the cartridge;
   (c) at least one seal plate for sealing one end of the cartridge, the at least one seal plate comprising an outer groove; and
   (d) a sealing ring seated in the outer groove, the sealing ring having a cross-sectional shape comprising:
   a rounded bottom portion;
   a flat front face;
   a flat rear face; and
   a top surface having a first flat surface and a second flat surface, the first flat surface connected to the flat front face and the second flat surface connected to the flat rear face, the first flat surface and second flat surface meeting to form a peak between the flat front face and the flat rear face, the first and second flat surfaces forming an angle of between 90° and 175° therebetween along an outer perimeter of the sealing ring.

8. The membrane separation unit of claim 7, wherein the at least one seal plate comprises at least one venting hole providing a passage between the interior of the cartridge and the outer groove.

9. A sealing ring for a membrane separation unit comprising a cross-sectional shape having:
   a rounded bottom portion;
   a flat front face;
   a flat rear face; and
   a top surface having a first flat surface and a second flat surface, the first flat surface connected to the flat front face and the second flat surface connected to the flat rear face, the first flat surface and second flat surface meeting to form a peak between the front face and the rear face, the first and second flat surfaces forming an angle of between 90° and 175° therebetween at the peak.

10. A seal plate for a membrane separation unit comprising:
    (a) a first part defining at least two concentric passages therethrough, a first passage of the at least two concentric passages being defined by a central ring and a second passage of the at least two concentric passages being defined between the central ring and an outer ring, the central ring and the outer ring being connected by one or more spokes, the outer ring having an outer groove adapted to hold a sealing ring; and
    (b) a second part comprising a disk defining a plurality of holes therein and a central passageway, the second part being adapted to be secured to the first part such that the central passageway is aligned with the first passage of the first part and the plurality of holes are aligned with the second passage; and
    (c) a sealing ring seated in the outer groove, the sealing ring having a cross-sectional shape that forms a circular venting path between the sealing ring and the seal plate, wherein a cross-section of the sealing ring comprises:
    a rounded bottom portion;
    a flat front face;
    a flat rear face; and
    a top surface having a first flat surface and a second flat surface, the first flat surface connected to the flat front face and the second flat surface connected to the flat rear face, the first flat surface and second flat surface meeting to form a peak between the flat front face and the flat rear face, the first and second flat surfaces forming an angle of between 90° and 175° therebetween,
    wherein the outer ring of the first part includes an inner annular pulling lip adapted to be grabbed by a person's hand as a gripping point for pulling the membrane separation unit out of a device housing; and
    wherein the outer ring comprises at least one venting hole formed between an inner surface of the outer ring and the outer groove.

11. The seal plate of claim 10, wherein the one or more spokes comprise a hollow interior.

12. The seal plate of claim 10, wherein the second part includes one or more projections adapted to form a snap fit connection with a portion of the central ring of the first part.

13. A membrane separation unit comprising:
    (a) a cartridge having an interior, an exterior, and a pair of ends;
    (b) at least one membrane disposed within the cartridge; and
    (c) the seal plate according to claim 10.

14. A seal plate system comprising a plurality of seal plates as defined by claim 10, wherein the system includes one first part and a plurality of different second parts each having a different arrangement of holes.

15. The seal plate system of claim 14, wherein each of the plurality of different second parts has a unique color.

16. A membrane separation unit comprising:
   (a) a cartridge having an interior, an exterior, and a pair of ends;
   (b) at least one membrane disposed within the cartridge;
   (c) a seal plate comprising at least an outer ring defining an outer groove adapted to hold a sealing ring, the outer ring comprising an inner annular lip as a gripping point for pulling the membrane separation unit out of a device housing; and
   (d) a sealing ring seated in the outer groove of the seal plate, the sealing ring having a cross-sectional shape having:
   a rounded bottom portion;
   a flat front face;
   a flat rear face; and
   a top surface having a first flat surface and a second flat surface, the first flat surface connected to the front face and the second flat surface connected to the rear face, the first flat surface and second flat surface meeting to form a peak between the front face and the rear face, the first and second flat surfaces forming an angle of between 90° and 175° therebetween.

\* \* \* \* \*